United States Patent
Chen

(10) Patent No.: US 8,164,683 B2
(45) Date of Patent: Apr. 24, 2012

(54) AUTO-FOCUS METHOD AND DIGITAL CAMERA

(75) Inventor: Yongbing Chen, Taipei Hsien (TW)

(73) Assignee: VIA Technologies, Inc., New Taipei (TW)

( * ) Notice: Subject to any disclaimer, the term of this patent is extended or adjusted under 35 U.S.C. 154(b) by 641 days.

(21) Appl. No.: 12/042,953

(22) Filed: Mar. 5, 2008

(65) Prior Publication Data

US 2009/0115886 A1    May 7, 2009

(30) Foreign Application Priority Data

Nov. 2, 2007    (CN) .......................... 2007 1 0165283

(51) Int. Cl.
*G03B 13/00* (2006.01)
*H04N 5/232* (2006.01)

(52) U.S. Cl. ....................................... 348/353; 348/345

(58) Field of Classification Search ........... 348/345–357
See application file for complete search history.

(56) References Cited

U.S. PATENT DOCUMENTS

| 5,231,443 | A | * | 7/1993 | Subbarao | 396/93 |
| 2002/0075383 | A1 | * | 6/2002 | Trobaugh et al. | 348/42 |
| 2003/0043289 | A1 | * | 3/2003 | Konno | 348/335 |
| 2006/0204120 | A1 | * | 9/2006 | Poon et al. | 382/254 |
| 2008/0124068 | A1 | * | 5/2008 | Kwon et al. | 396/127 |
| 2009/0079862 | A1 | * | 3/2009 | Subbotin | 348/345 |

* cited by examiner

*Primary Examiner* — Tuan Ho
*Assistant Examiner* — Christopher K Peterson
(74) *Attorney, Agent, or Firm* — J.C. Patents

(57) ABSTRACT

An auto-focus method for camera is provided. First, a digital signal processor sets a first parameter p and a second parameter q. An image capture unit captures an only image. Then, the digital signal processor utilizes the only image, the first parameter p and the second parameter q to compute an object distance. Then, an optical focusing device utilizes the object distance to regulate a focal position. Therefore, the present invention substantially shortens the time for regulating the focal position.

22 Claims, 10 Drawing Sheets

|  |  |  |
|---|---|---|
| 1 | 2 | 1 |
| 0 | 0 | 0 |
| −1 | −2 | −1 |

|  |  |  |
|---|---|---|
| −1 | 0 | 1 |
| −2 | 0 | 2 |
| −1 | 0 | 1 |

AUTO-FOCUS METHOD AND DIGITAL CAMERA

CROSS-REFERENCE TO RELATED APPLICATION

This application claims the priority benefit of Chinese application serial no. 200710165283.5, filed on Nov. 2, 2007. The entirety of the above-mentioned patent application is hereby incorporated by reference herein and made a part of this specification.

BACKGROUND OF THE INVENTION

1. Field of the Invention

The present invention relates to an auto-focus method for camera, and particularly to a method of obtaining a focal position automatically utilizing an only single image.

2. Description of Related Art

With development in the technology and extensive use of digital devices, the relationship forged between people and digital products has become increasingly closer. Among the digital products, the digital camera (DC) has occupied a rather important share. To determine whether a digital camera is good or bad, besides the imaging quality, the focusing technique of the digital camera also needs to be taken into consideration. Focusing in a digital camera has to be conducted not only fast, but also accurately. The speed and effect of focusing would directly affect the speed and quality of imaging in the digital camera.

As far as the current focusing technique is concerned, completion of the focusing in a camera is determined by a feature function. FIG. 1 is a schematic view illustrating a conventional focusing process in a camera. Referring to FIG. 1, during the focusing process in a camera, pictures need to be taken at a plurality of focal points respectively to estimate or determine a position of an optimal focal point. Therefore, the captured picture needs to undergo a process of "blur-clearness-blur-clearness resumed". The process of searching for the focal point is rather time-consuming. Moreover, focusing conducted in this method does not comply with consumers' natural habits, and the method also requires photographing at a plurality of focal points and thereby increasing the power consumption of the digital camera. However, today's consumers not only pursue the quality of photographs taken by a camera, but also value the sustainability of batteries in the camera. Therefore, if focusing is conducted in a more power-saving method, the sustainability of the batteries in the camera can be significantly increased.

In consideration of the aforementioned, relevant manufacturers of cameras all seek after suitable solutions to solve the said problem.

SUMMARY OF THE INVENTION

The present invention provides an auto-focus method for camera so as to save time of focusing.

The present invention provides a digital camera, which does not require a reflector to conduct the focusing function such that the cost of hardware is lowered, the image quality is enhanced and the volume of the digital camera is reduced as well.

The auto-focus method for camera provided by the present invention includes the following: setting a first parameter p and a second parameter q related to the camera, and capturing an only image. Further, an object distance is computed according to the only image, the first parameter p and the second parameter q. Next, a focal position is regulated according to the object distance.

According to one embodiment of the present invention, in the auto-focus method for camera, setting the first parameter p and the second parameter 4 includes the following: First, an identical light source is photographed from a plurality of variable distances Di respectively to obtain corresponding images Fi. Then, respective diffusion parameters σi are computed by a Gaussian distribution and according to the images Fi. Next, a data collection (Di, σi) is established using the variable distances Di and the diffusion parameters σi corresponding thereto. Finally, the first parameters p and the second parameters q are set according to the data collection (Di, σi) and i is a corresponding serial number.

According to one embodiment of the present invention, in the auto-focus method for camera, computing the object distance according to the image, the first parameter p and the second parameter q includes the following: First, a boundary of an image is captured by an edge detection algorithm. Next, an object diffusion parameter σ is estimated, and then an object distance is computed according to the object diffusion parameter σ, the first parameter p and the second parameter q.

The present invention provides a digital camera including an optical focusing device, an image capture unit and a digital signal processor. The optical focusing device is adapted for regulating a focal position of the digital camera. The image capture unit is disposed on a light path of the optical focusing device adapted for capturing an image. The digital signal processor is coupled to the optical focusing device and the image capture unit. The digital signal processor sets the first parameter p and the second parameter q related to the digital camera. The image capture unit captures an only image. Further, the digital signal processor computes an object distance according to the only image, the first parameter p and the second parameter q. The digital signal processor sends a focusing signal based on the object distance. The optical focusing device focuses according to the focusing signal.

In the present invention, the first parameter p and the second parameter q related to the camera are set in one step. In another step, an only image is collected. Then, an object distance is computed according to the only image, the first parameter p and the second parameter q. Afterwards, a focal position is regulated according to the object distance. Hence, a focal length can be regulated by analyzing the only image and thereby significantly reducing the time for focusing.

In order to make the aforementioned and other objects, features and advantages of the present invention more comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6B illustrates a schematic diagram of a horizontal operator of an edge detection algorithm according to one embodiment of the present invention.

FIG. 6C illustrates a schematic diagram of a vertical operator of an edge detection algorithm according to one embodiment of the present invention.

DESCRIPTION OF EMBODIMENTS

Figure 1:
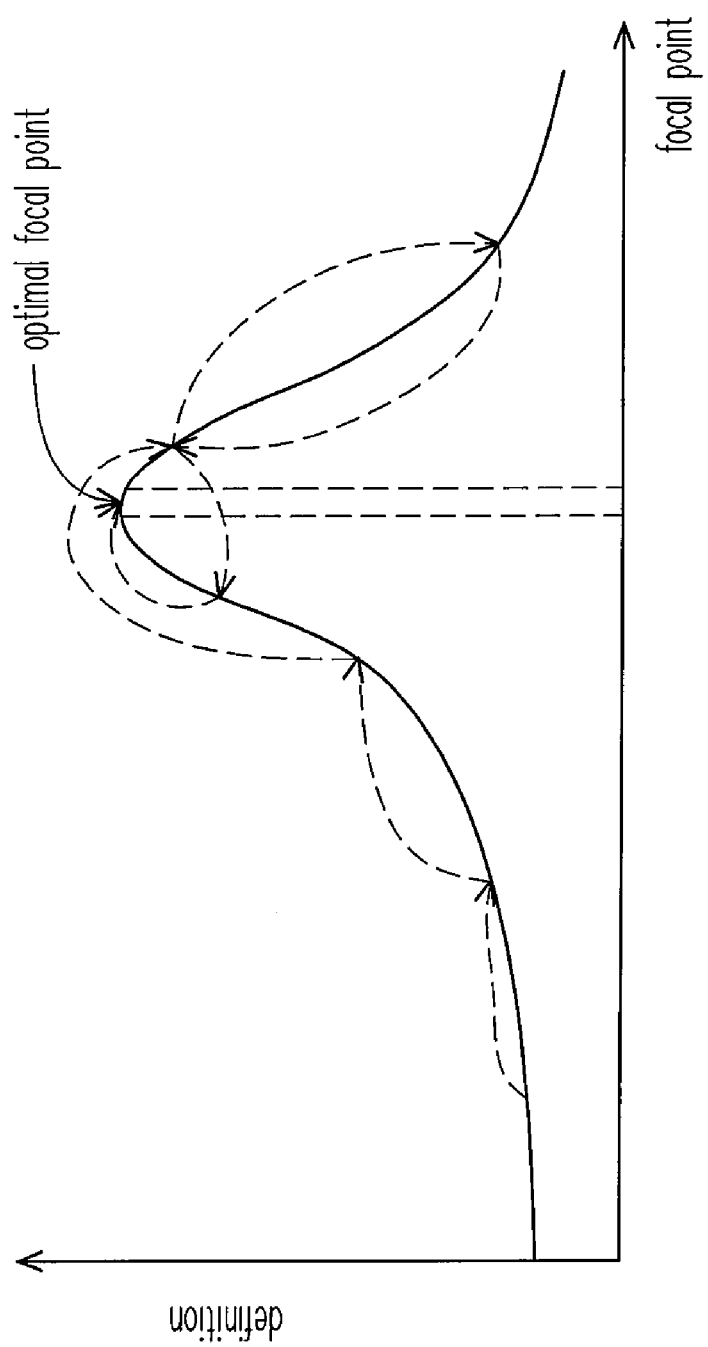
FIG. 1 is a schematic diagram illustrating a conventional focusing process of a camera.
Figure 2A:
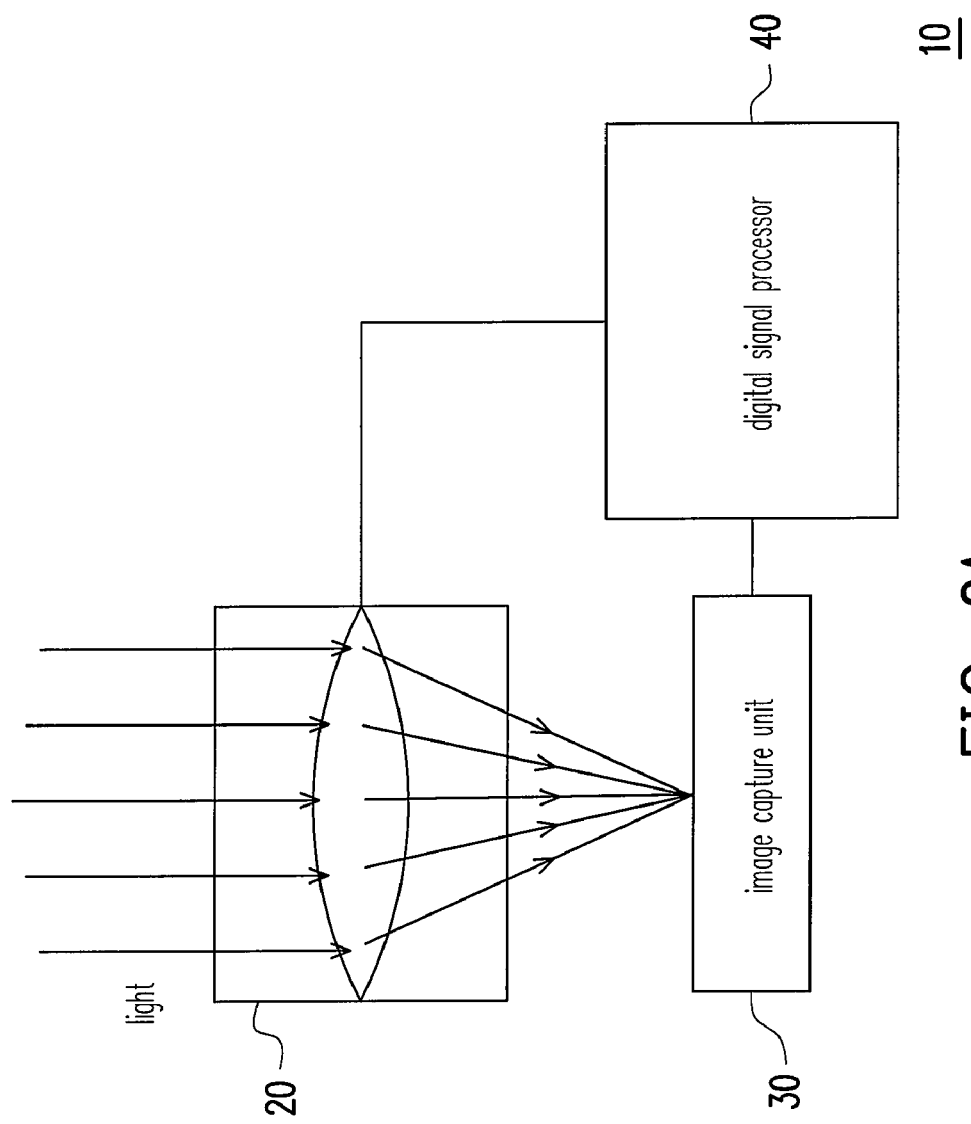
FIG. 2A illustrates a schematic diagram of a digital camera according to one embodiment of the present invention.
Figure 2B:
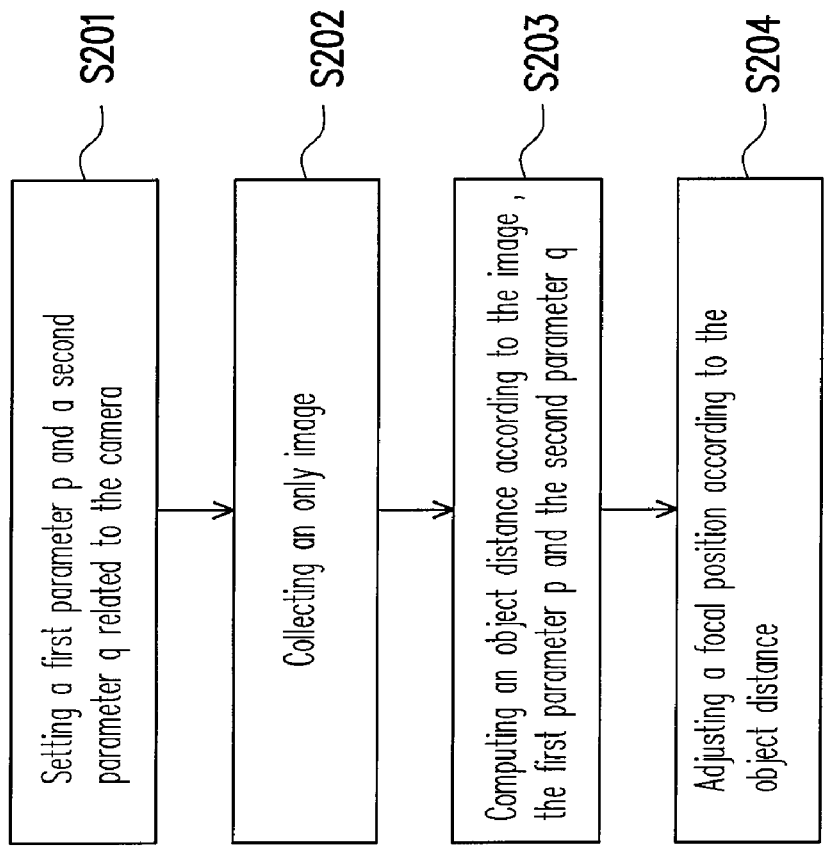
FIG. 2B illustrates a flowchart of an auto-focus method according to one embodiment of the present invention.

FIG. 2A is a schematic diagram of a digital camera according to one embodiment of the present invention. FIG. 2B is a flowchart of an auto-focus method according to one embodiment of the present invention. Referring to both FIGS. 2A and 2B, a digital camera 10 includes an optical focusing device 20, an image capture unit 30 and a digital signal processor 40. The optical focusing device 20 is adapted for regulating a focal position of the digital camera 10. The image capture unit 30 is disposed on a light path of the optical focusing device 20 adapted for capturing an image. The image capture unit 30 is a charge coupled device (CCD), for example. The digital signal processor 40 (DSP) is coupled to the optical focusing device 20 and the image capture unit 30.

First, in a step S201, the digital signal processor 40 sets a first parameter p and a second parameter q related to the camera. In a step S202, the image capture unit 30 captures an only image. In a step S203, the digital signal processor 40 computes an object distance according to the only image, the first parameter p and the second parameter q. In a step S204, the digital signal processor 40 sends a focusing signal to the optical focusing device 20 according to the object distance, and the optical focusing device 20 proceeds to focus based on the focusing signal. Thus, focusing is performed simply according to the only image and thereby significantly reducing the time spent on focusing by the digital camera. Next, a more detailed description with regard to the foregoing steps is provided in the following.

Figure 3:
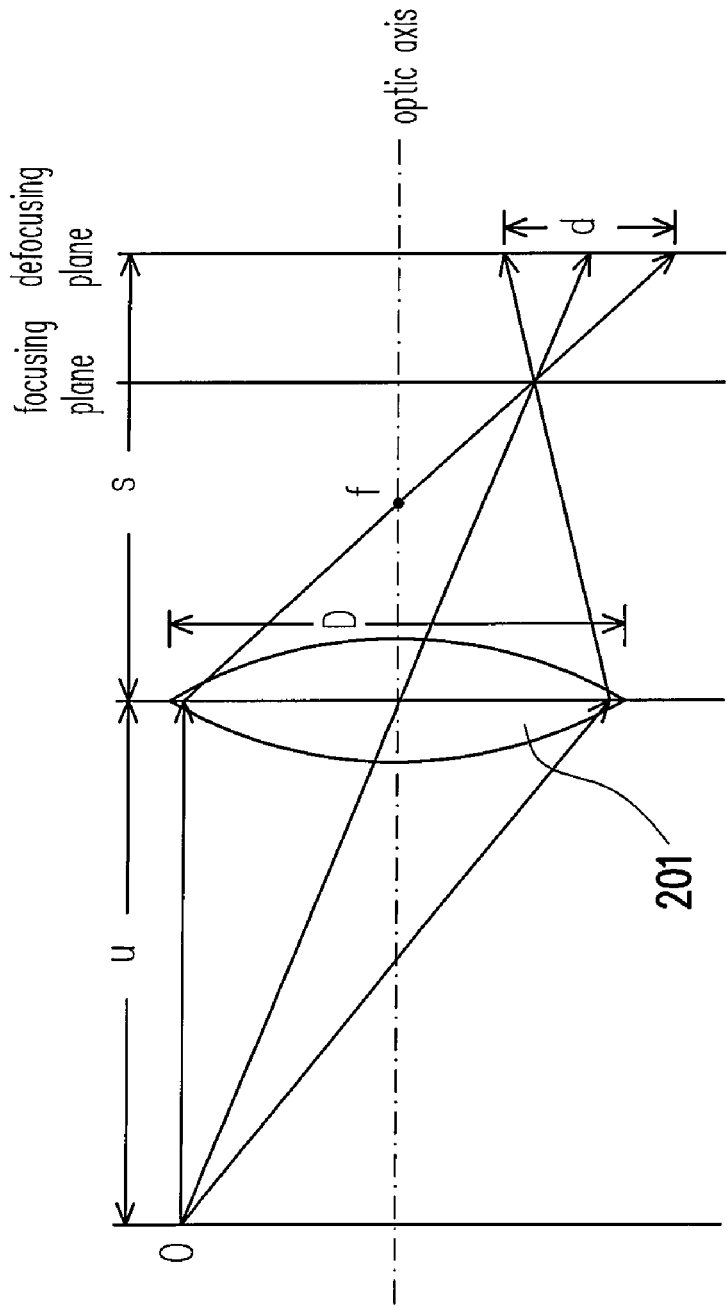
FIG. 3 illustrates a schematic diagram of an imaging system according to one embodiment of the present invention.

FIG. 3 is a schematic diagram of an imaging system according to one embodiment of the present invention. Referring to FIG. 3, an object distance u therein is a distance between a point light source O and a lens 201. s is a distance between a defocusing plane and the lens 201; f is a focal point of the lens 201; D is an aperture of the lens 201 and d is an image formed on the defocusing plane by the point light source O. From FIG. 3, a relationship between the object distance u and the aperture D can be inferred as a formula (1).

$$u = \frac{sf}{s - f - Fd}. \quad \text{Formula (1)}$$

In Formula (1), $F = \frac{f}{D}$, and F is an aperture coefficient of the lens 201. In consideration of the influence of a diffraction effect and a lens imaging system, a point diffusion function of the defocusing plane can be described in a two-dimensional Gaussian distribution G (r, σ). r is a distance parameter from a center in the Gaussian distribution. $σ = k^{-1}d$, and k is a constant determined by characteristics of the lens. When such relationship is applied to Formula (1), a relationship between the object distance u and the point diffusion function parameter σ is stated as a following formula (2).

$$u = \frac{sf}{s - f - Fd} = \frac{p}{q - σ}. \quad \text{Formula (2)}$$

The first parameter p and the second parameter q are ascertained system parameters, and thereby an accurate estimation of the object distance u can be obtained through an accurate estimation of σ. The following is a more detailed description as to how to set the first parameter p and the second parameter q.

Figure 4:
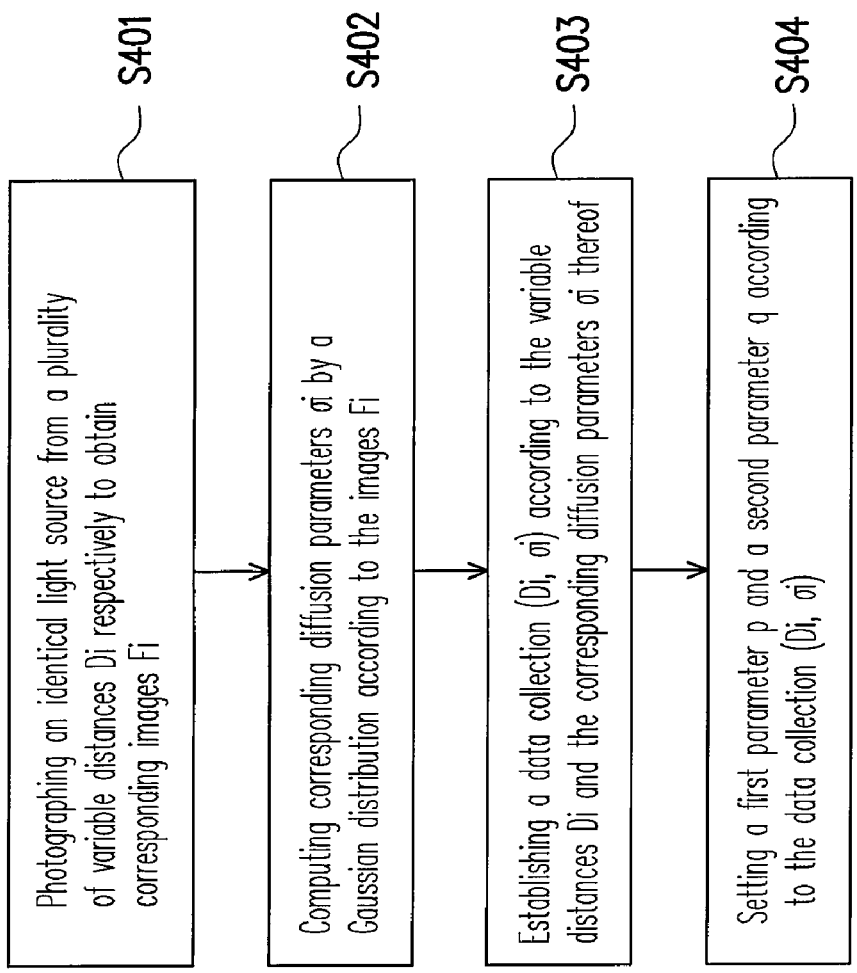
FIG. 4 illustrates a flowchart of setting a first parameter p and a second parameter q according to one embodiment of the present invention.

FIG. 4 illustrates a flowchart of setting a first parameter p and a second parameter q according to one embodiment of the present invention. Referring to FIGS. 4, 2A and 3, in a first step S401, a digital camera 10 photographs an identical light source from a plurality of variable distances Di respectively to obtain a plurality of corresponding images Fi. In a step S402, corresponding diffusion parameters σi are computed based on a Gaussian distribution according to the corresponding images Fi. In a step S403, a data collection (Di, σi) is established utilizing the plurality of variable distances Di and the corresponding diffusion parameters σi thereof. In a step S404, the first parameter p and the second parameter q are set according to the data collection (Di, σi), and i is a corresponding serial number. In other words, the more data are collected in the data collection (Di, σi), the more accurate the estimated first parameters p and second parameters q will be.

Further, based on the data collection (Di, σi) and a cost function $$C'(p, q) = \sum_i \left( Di - \frac{p}{q - σi} \right)^2,$$

an iteration method, such as a Newton's method, is utilized to estimate the first parameter p and the second parameter q. Persons of ordinary skill in the art should know that the "Newton's method" cited in the present embodiment is only one specific embodiment. In another embodiment, an iteration method may utilize a steepest descent, a Newton's method and the steepest descent alternately to compute or otherwise. The present invention should not be limited to this specific embodiment. Finally, the first parameter p and the second parameter q are set in the digital signal processor 40. The digital camera 10 may utilize the only single image and Formula (2) to compute and obtain the object distance u.

It is noted that the steps S401-S404 can be preset in the digital camera 10 before it leaves the factory. Therefore, when consumers use the digital camera 10, they will be spared the trouble of setting the first parameter p and the second parameter q. People of ordinary skill in the art should know that the steps S402-S404 may be performed by the digital signal processor 40. In another embodiment of the present invention, other external operators, such as a personal computer, can be utilized to conduct calculation. Hence, the present invention is not limited to the present embodiment.

After the first parameter p and the second parameter q are set, when consumers are using the digital camera 10, they only need to photograph an only single image in order for the digital camera 10 to conduct focusing. The following describes in more detail how to compute the object distance u based on the only single image.

Figure 5:
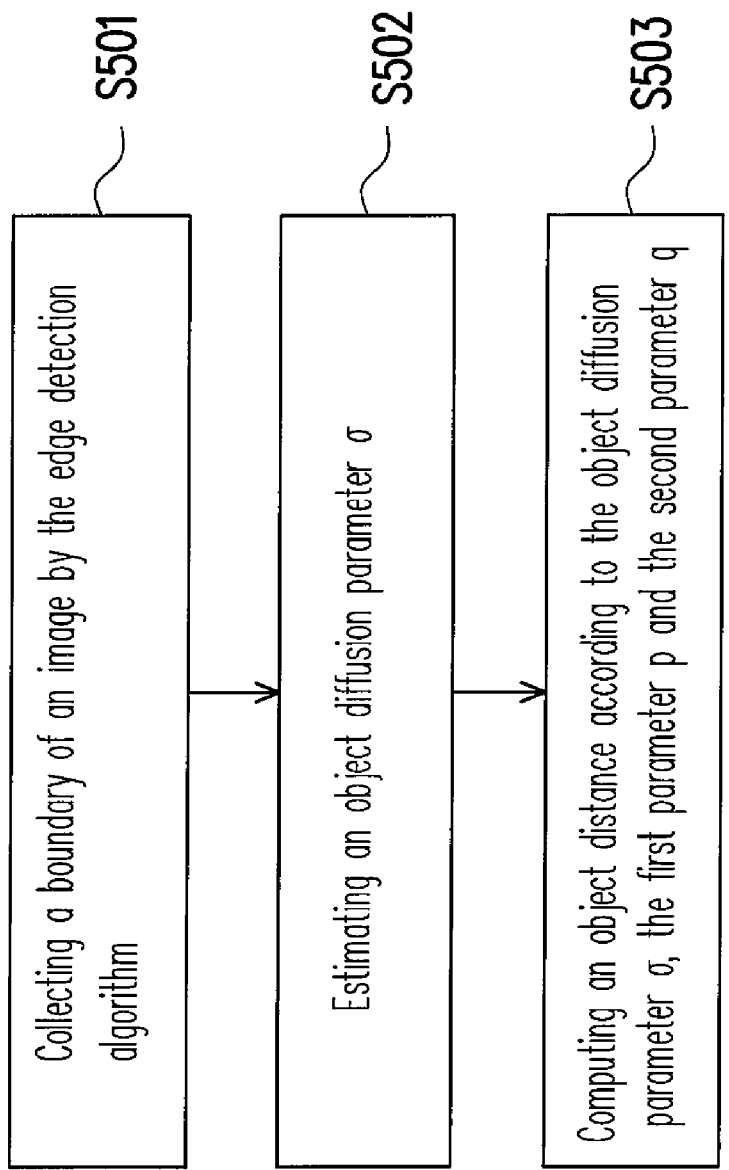
FIG. 5 illustrates a flowchart of computing an object distance according to an only image, a first parameter p and a second parameter q in one embodiment of the present invention.

FIG. 5 illustrates a flowchart of computing an object distance according to an only single image, a first parameter p and a second parameter q in one embodiment of the present invention. Referring to FIGS. 5 and 2A, how a digital signal processor 40 in the present embodiment performs following steps is described below as an example for further explanation. First, in a step S501, a boundary of a single image is captured by a boundary algorithm. In a step S502, an object diffusion parameter σ is estimated. In a step S503, an object distance u is computed according to the object diffusion σ, the first parameter p and the second parameter q by a formula (2), for example. Next, a more detailed description regarding the step S501 is provided below.

Figure 6A:
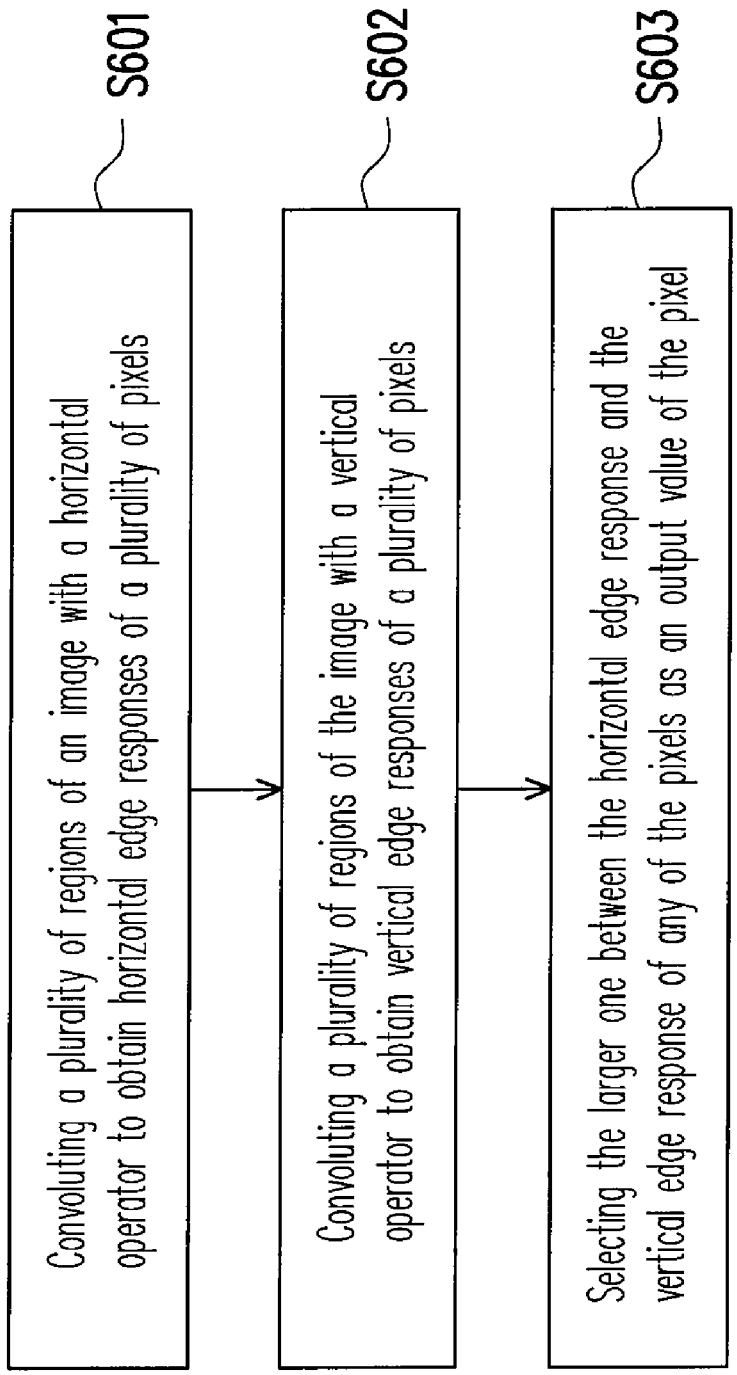
FIG. 6A illustrates a flowchart of obtaining a boundary of an image by an edge detection algorithm according to one embodiment of the present invention.
Figures 6B, 6C:
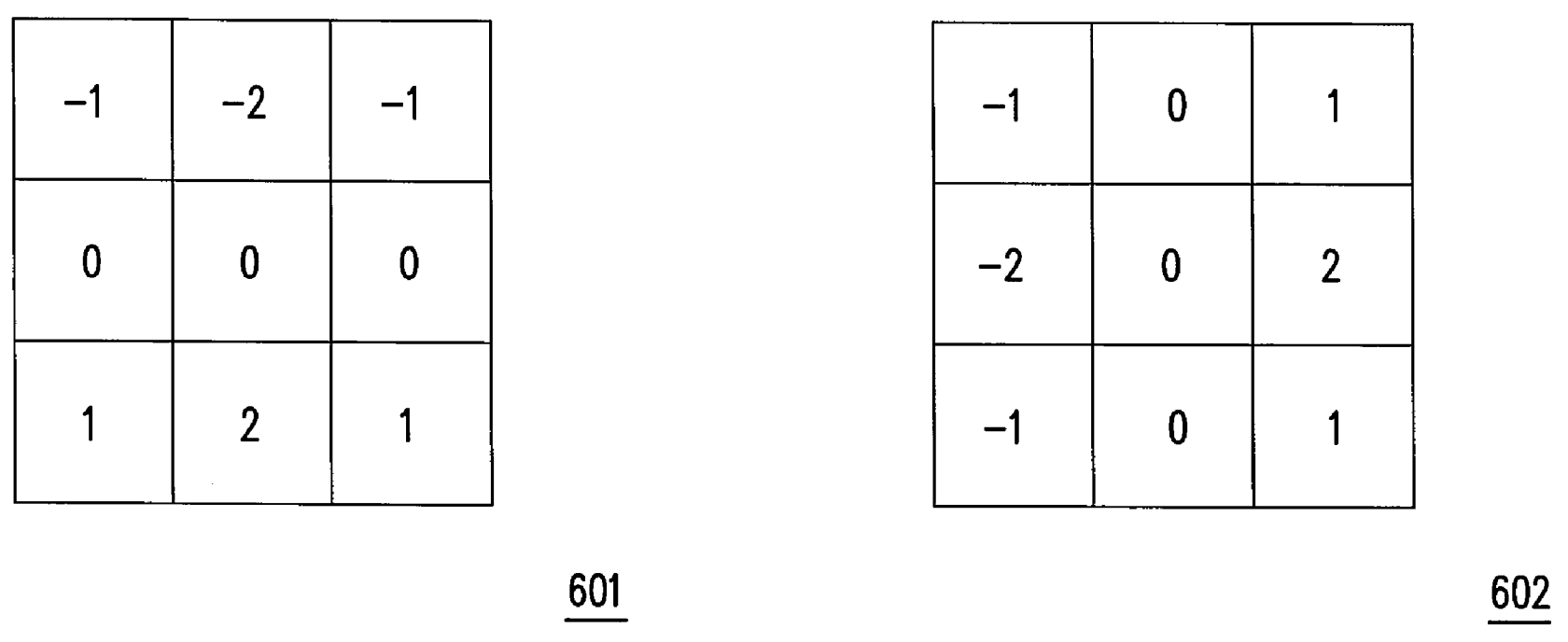

FIG. 6A illustrates a flowchart of obtaining a boundary of an image by a edge detection algorithm according to one embodiment of the present invention. FIG. 6B is a schematic diagram illustrating a horizontal operator of a edge detection algorithm according to one embodiment of the present invention. FIG. 6C is a schematic diagram illustrating a vertical operator of a edge detection algorithm according to one embodiment of the present invention. Referring to FIGS. 6A, 6B and 6C, in the present embodiment, a Sobel edge detection algorithm is used as an example for explanation. In another embodiment, a gradient edge detection algorithm may also be utilized. First, in a step S601, a plurality of regions of an only single image captured is convoluted with a horizontal operator 601 respectively to obtain edge responses of a plurality of pixels in the single image. An operator may also be called as a mask or a kernel. In a step S602, the plurality of regions of the captured only single image is convoluted with a vertical operator 602 respectively to obtain vertical edge responses of the plurality of pixels in the single image.

It should be noted that the horizontal operator 601 has a characteristic of strengthening a horizontal margin. The vertical operator 602 has a characteristic of strengthening a vertical margin. In order to have both the characteristics of the horizontal operator 601 and the vertical operator 602, in a step S603, the larger one between the horizontal edge response and the vertical response of any of the pixels in the image is selected as an output value of the pixel. Thus, a connected line of the plurality of pixels with their output values as extreme values is considered as the boundary of the only single image. The said extreme value is a maximum value of grayscale data displayed by a pixel, for example. People of ordinary skill in the art may also determine a set value on their own so as to determine whether the output value of a pixel is an extreme value.

In addition, the "operators" cited in FIGS. 6B and 6C of the present embodiment are simply one specific embodiment. In another embodiment, the operators may still use a gradient operator or other weighted or size operators. The present invention should not be limited to this specific embodiment. Next, a more detailed description regarding the step S502 is provided below.

Figure 7:
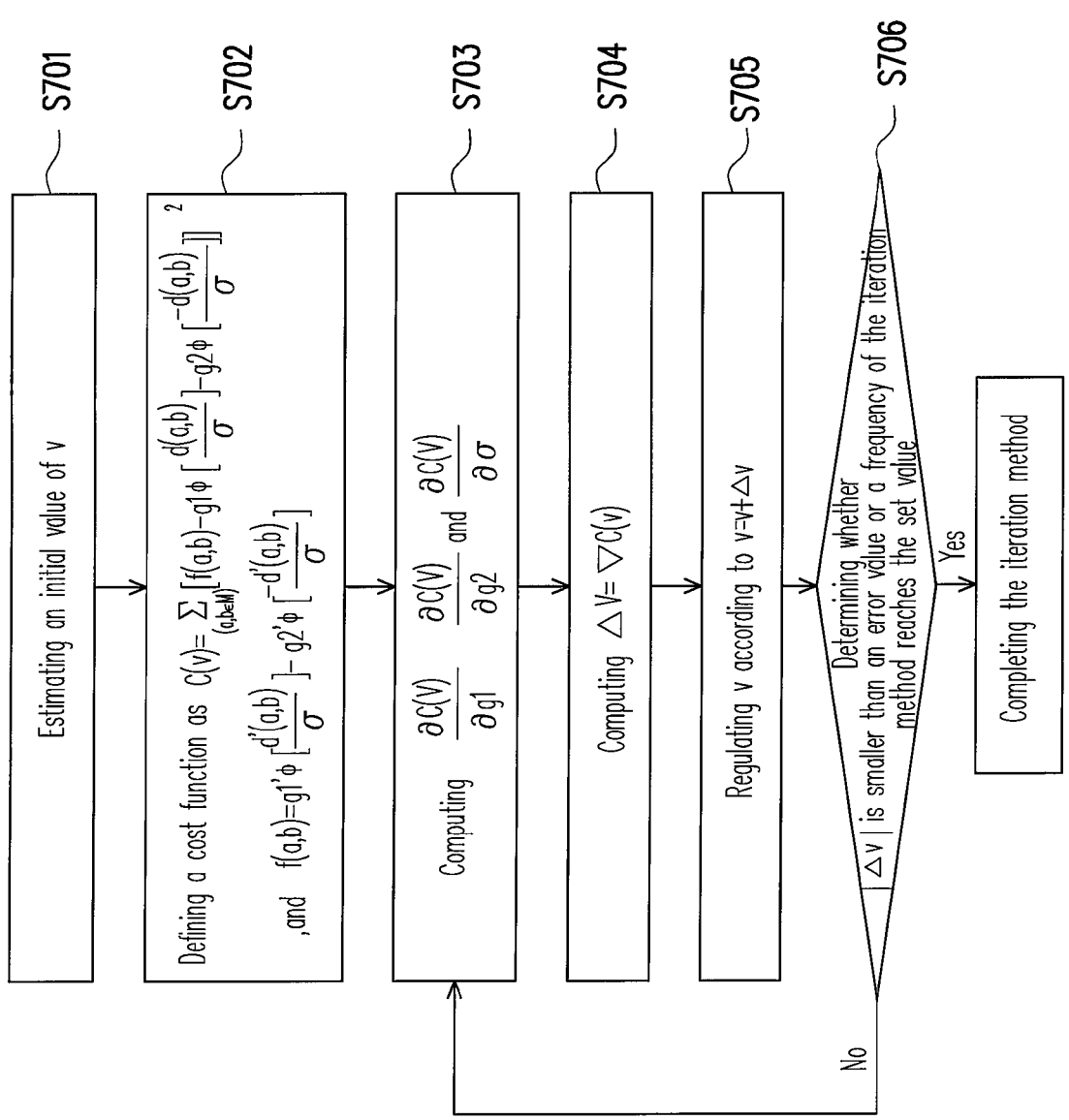
FIG. 7 illustrates a flowchart of estimating an object diffusion parameter σ by an iteration method according to one embodiment of the present invention.
Figure 8B:
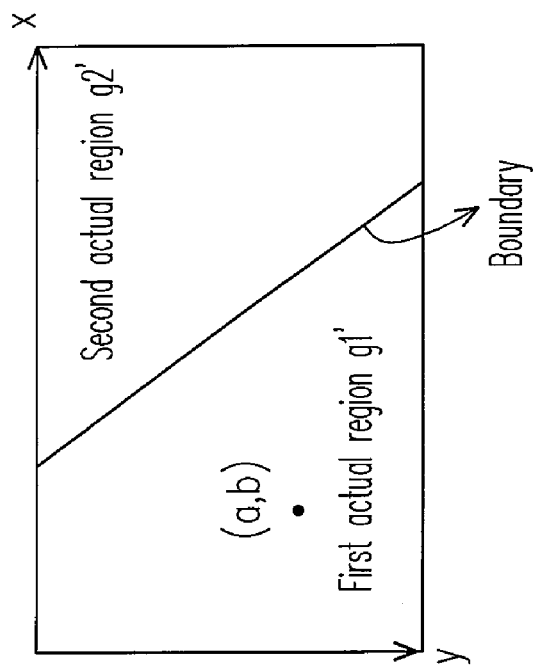
FIG. 8B illustrates a flowchart of estimating an object diffusion parameter σ by an iteration method according to one embodiment of the present invention.
Figure 8A:
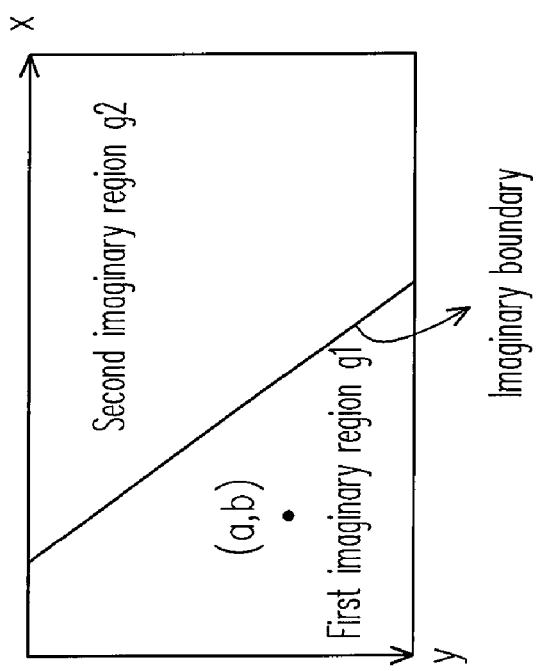
FIG. 8A is a schematic diagram of dividing an image into two regions with an imaginary boundary according to one embodiment of the present invention.

FIG. 7 illustrates a flowchart of estimating an object diffusion parameter σ by an iteration method according to one embodiment of the present invention. FIG. 8A illustrates a schematic diagram of dividing an image into two regions with an imaginary boundary according to one embodiment of the present invention. FIG. 8B illustrates a flowchart of estimating an object diffusion parameter σ by an iteration method according to one embodiment of the present invention. Referring to FIGS. 7, 8A and 8B, in the present embodiment, the iteration method is exemplified by a gradient descent for further explanation. In another embodiment, the iteration method may also utilize a Newton's method or a steepest descent. First, in a step S701, a group of initial values of v are estimated, and v=(g1,g2,σ). Suppose that there is an imaginary boundary dividing a captured single image into a first imaginary region g1 and a second imaginary region g2.

Next, in a step S702, a cost function is defined as $$C(v) = \sum_{(a,b \in M)} \left[ f(a,b) - g1\Phi\left[\frac{d(a,b)}{\sigma}\right] - g2\Phi\left[\frac{-d(a,b)}{\sigma}\right] \right]^2,$$

and $$f(a,b) = g1'\Phi\left[\frac{d'(a,b)}{\sigma}\right] - g2'\Phi\left[\frac{-d'(a,b)}{\sigma}\right].$$

The image boundary obtained from the step S501 divides the image into a first actual region g1' and a second actual region g2'. M is a region of the image, and (a,b) is a coordinate of any pixel in the region. d(a,b) is a distance between the pixel coordinate (a,b) and the imaginary boundary of the image. d'(a,b) is a distance between the pixel coordinate (a,b) and the boundary of the image. Φ is a Gaussian distribution function. Alternatively speaking, f(a,b) is a known value;

$$g1\Phi\left[\frac{d(a,b)}{\sigma}\right]$$

is an estimated value obtained from convolution of the first imaginary region g1 and the Gaussian distribution function;

$$g2\Phi\left[\frac{-d(a,b)}{\sigma}\right]$$

is an estimated value obtained from convolution of the second imaginary region g2 and the Gaussian distribution function. The cost function C (v) is a better object diffusion parameter σ estimated by a principle of minimum mean-square error.

Furthermore, in a step S703, $$\frac{\partial C(V)}{\partial g1}, \frac{\partial C(V)}{\partial g2} \text{ and } \frac{\partial C(V)}{\partial \sigma}$$

are computed. In a step S704, Δv=∇C(v) is computed, which means the computed $$\frac{\partial C(V)}{\partial g1}, \frac{\partial C(V)}{\partial g2} \text{ and } \frac{\partial C(V)}{\partial \sigma}$$

and a current v value are applied to the cost function C(v) to obtain a group of adjustment values Δv. In a step S705, v is regulated according to v=v+Δv. In a step S706, when |Δv| is smaller than an error value or a frequency of an iteration method reaches a set value, the iteration method is completed. It should be noted that persons of ordinary skill in the art may determine the error value and the set value to suit their own needs. If $|\Delta v|$ is not smaller than the error value and the frequency of the iteration method does not the set value, the step S703 will be reverted to continue with the iteration method. Thus, a better object diffusion function σ can be obtained. Since the first parameter p, the second parameter q and the object diffusion parameter σ are all known, an object distance u can be further obtained by Formula (2).

Moreover, it is noted that although the above embodiment has described a possible model of computing the object distance u, people ordinarily skilled in the art should know that each company has its own different method of computing an object distance and it certainly may replace each of the foregoing algorithms with any easier formula to suit its own needs so that time spent on operation is reduced and a cost of hardware is lowered as well. In other words, as long as a method of computing the object distance u complies with the principle of the above-mentioned embodiment, the method has conformed to the spirit of the present invention.

Further referring to FIG. 2A, after the object distance u is obtained, the digital signal processor 40 may output the focusing signal to the optical focusing device 20 according to the object distance u. The focusing signal includes a distance and a direction to be regulated in the lens of the digital camera 10. The optical focusing device 20 focuses according to the focusing signal to allow the image capture unit 30 to obtain a clear image so that the quality of the captured image is enhanced and the power consumption is reduced.

In conclusion, the embodiments of the present invention include at least the following advantages:
1. By utilizing only one single image, the object distance u is obtained and the focal position of the digital camera is regulated such that not only is focusing accelerated, but the clarity of the image is also enhanced.
2. In the embodiments of the present invention, the digital camera does not require a reflector to conduct the focusing function such that the hardware cost and power consumption are lowered, the image quality is enhanced and the volume of the digital camera is reduced as well.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An auto-focus method for camera comprising:
 setting a single set of parameters related to the camera, wherein the set of parameters comprises a first parameter p and a second parameter q;
 collecting a single image;
 capturing a boundary of the image by an edge detection algorithm;
 estimating an object diffusion parameter σ;
 computing an object distance according to the object diffusion parameter σ, the first parameter p and the second parameter q; and
 regulating a focal position according to the object distance.
2. The auto-focus method for camera of claim 1, wherein setting the first parameter p and the second parameter q comprises:
 photographing an identical light source from a plurality of variable distances Di respectively to obtain a plurality of corresponding images Fi;
 computing corresponding diffusion parameters σi with a Gaussian distribution and according to the images Fi respectively;
 establishing a data collection (Di, σi) based on the variable distances Di and the corresponding diffusion parameters σi thereof; and
 setting the first parameter p and the second parameter q according to the data collection (Di, σi), wherein i is a corresponding serial number.
3. The auto-focus method for camera of claim 2, wherein setting the first parameter p and the second parameter q according to the data collection (Di, σi) comprises:
 setting the first parameter p and the second parameter q by an iteration method according to the data collection (Di, σi) and a cost function, wherein the cost function is

$$C'(p,q) = \sum_i \left( Di - \frac{p}{q - \sigma i} \right)^2.$$

4. The auto-focus method for camera of claim 3, wherein the iteration method is a Newton's method.
5. The auto-focus method for camera of claim 1, wherein capturing the boundary of the image by the edge detection algorithm comprises:
 convoluting a plurality of regions of the image with a horizontal operator respectively to obtain horizontal edge responses of a plurality of pixels of the image;
 convoluting the regions of the image with a vertical operator respectively to obtain vertical edge responses of the pixels of the image; and
 selecting the larger one between the horizontal edge response and the vertical edge response of any of the pixels as an output value of the pixel, wherein a plurality of pixels whose output values are extreme values are connected as the boundary of the image.
6. The auto-focus method for camera of claim 5, wherein the horizontal operator and the vertical operator are Sobel operators.
7. The auto-focus method for camera of claim 5, wherein the horizontal operator and the vertical operator are gradient operators.
8. The auto-focus method for camera of claim 1, wherein estimating the object diffusion parameter σ comprises:
 estimating the object diffusion parameter σ with an iteration method.
9. The auto-focus method for camera of claim 8, wherein the iteration method is a gradient descent method.
10. The auto-focus method for camera of claim 8, wherein estimating the object diffusion parameter σ by the iteration method comprises:
 estimating a group of initial values of v, wherein v=(g1,g2, σ), an imaginary boundary dividing the image into a first imaginary region g1 and a second imaginary region g2;
 defining a cost function $$C(v) = \sum_{(a,b \in M)} \left[ f(a,b) - g1\Phi\left[\frac{d(a,b)}{\sigma}\right] - g2\Phi\left[\frac{-d(a,b)}{\sigma}\right] \right]^2,$$

wherein $$f(a,b) = g1'\Phi\left[\frac{d'(a,b)}{\sigma}\right] - g2'\Phi\left[\frac{-d'(a,b)}{\sigma}\right],$$

the boundary of the image divides the image into a first actual region g1' and a second actual region g2', M being a region of the image, (a, b) being a coordinate of any pixel in the region, d(a, b) being a distance between the pixel coordinate and the imaginary boundary of the image, d'(a, b) being a distance between the pixel coordinate and the boundary of the image, Φ is a Gaussian distribution function;

computing $\frac{\partial C(V)}{\partial g1}$, $\frac{\partial C(V)}{\partial g2}$ and $\frac{\partial C(V)}{\partial \sigma}$;

computing Δv=C(v), the computed $\frac{\partial C(V)}{\partial g1}$, $\frac{\partial C(V)}{\partial g2}$ and $\frac{\partial C(V)}{\partial \sigma}$ and a current v value applied to the cost function C(v) so as to obtain a group of adjustment values Δv;
regulating v according to v=v+Δv; and
completing the iteration method when |Δv| is smaller than an error value or a frequency of an iteration method reaches a set value.

11. The auto-focus method for camera of claim 1, wherein computing the object distance according to the object diffusion parameter σ, the first parameter p and the second parameter q comprises:
computing the object distance according to $$u = \frac{p}{q - \sigma},$$

wherein u is the object distance.

12. A digital camera comprising:
an optical focusing device, adapted for regulating a focal position of the digital camera;
an image capture unit, disposed on a light path of the optical focusing device adapted for capturing a single image; and
a digital signal processor, coupled to the optical focusing device and the image capture unit,
wherein the digital signal processor sets a single set of parameters related to the digital camera; the set of parameters comprises a first parameter p and a second parameter q; the image capture unit captures the single image; the digital signal processor captures a boundary of the image by an edge detection algorithm; the digital signal processor estimates an object diffusion parameter σ and computes an object distance according to the object diffusion parameter σ, the first parameter p and the second parameter q; the digital signal processor sends a focusing signal according to the object distance and the optical focusing device focuses according to the focusing signal.

13. The digital camera of claim 12, wherein the digital camera photographs an identical light source from a plurality of variable distances Di respectively so that the image capture unit obtains a plurality of corresponding images Fi; the digital signal processor computes corresponding diffusion parameters σi based on a Gaussian distribution and according to the images Fi; the digital signal processor establishes a data collection (Di, σi) according to the variable distances Di and the corresponding diffusion parameters σi and sets the first parameter p and the second parameter q according to the data collection (Di, σi), i being a corresponding serial number.

14. The digital camera of claim 13, wherein the digital signal processor sets the first parameter p and the second parameter q by an iteration method according to the data collection (Di, σi) and a cost function, wherein the cost function is $$C'(p, q) = \sum_i \left(Di - \frac{p}{q - \sigma i}\right)^2.$$

15. The digital camera of claim 14, wherein the iteration method is a Newton's method.

16. The digital camera of claim 12, wherein the digital signal processor convolutes a plurality of regions of the image with a horizontal operator respectively to obtain horizontal edge responses of a plurality of pixels of the image; the digital signal processor convolutes the regions of the image with a vertical operator respectively to obtain vertical edge responses of the pixels of the image; the digital signal processor selects the larger one between the horizontal edge response and the vertical edge response of any pixel as an output value of the pixel, wherein a plurality of pixels whose output values are extreme values are connected as a boundary of the image.

17. The digital camera of claim 16, wherein the horizontal operator and the vertical operator utilized by the digital signal processor are Sobel operators.

18. The digital camera of claim 16, wherein the horizontal operator and the vertical operator utilized by the digital signal processor are gradient operators.

19. The digital camera of claim 12, wherein the digital signal processor estimates the object diffusion parameter σ by an iteration method.

20. The digital camera of claim 19, wherein the iteration method utilized by the digital signal processor is a gradient descent method.

21. The digital camera of claim 19, wherein the digital signal processor estimates a group of initial values of v, wherein v=(g1,g2,σ) and utilizes an imaginary boundary to divide the image into a first imaginary region g1 and a second imaginary region g2; the digital signal processor defines a cost function $$C(v) = \sum_{(a,b \in M)} \left[f(a, b) - g1\Phi\left[\frac{d(a, b)}{\sigma}\right] - g2\Phi\left[\frac{-d(a, b)}{\sigma}\right]\right]^2,$$

wherein $$f(a, b) = g1'\Phi\left[\frac{d'(a, b)}{\sigma}\right] - g2'\Phi\left[\frac{-d'(a, b)}{\sigma}\right],$$

the boundary of the image dividing the image into a first actual region g1' and a second actual region g2', M being a region of the image, (a,b) being any pixel coordinate of the region, d(a,b) being a distance between the pixel coordinate and the imaginary margin, d'(a,b) being a distance between the pixel coordinate and the margin, Φ being a Gaussian distribution function; the digital signal processor computes $$\frac{\partial C(V)}{\partial g1}, \frac{\partial C(V)}{\partial g2} \text{ and } \frac{\partial C(V)}{\partial \sigma}$$

and then Δv=C(v), applying the computed $$\frac{\partial C(V)}{\partial g1}, \frac{\partial C(V)}{\partial g2} \text{ and } \frac{\partial C(V)}{\partial \sigma}$$

and a current v value to the cost function C(v) so as to obtain a group of adjustment values $\Delta v$; the digital signal processor regulates v according to $v=v+\Delta v$ and determines whether to complete the iteration method, wherein when $|\Delta v|$ is smaller than an error value or a frequency of the iteration method reaches a set number, the iteration method will be completed.

22. The digital camera of claim 12, wherein the digital signal processor computes the object distance according to $$u = \frac{p}{q-\sigma},$$

wherein u is the object distance.

* * * * *